US010649273B2

(12) United States Patent
Diaz et al.

(10) Patent No.: US 10,649,273 B2
(45) Date of Patent: May 12, 2020

(54) LED ASSEMBLY FOR TRANSPARENT LIQUID CRYSTAL DISPLAY AND STATIC GRAPHIC

(71) Applicant: Manufacturing Resources International, Inc., Alpharetta, GA (US)

(72) Inventors: Marcos Diaz, Alpharetta, GA (US); William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 699 days.

(21) Appl. No.: 14/878,679

(22) Filed: Oct. 8, 2015

(65) Prior Publication Data

US 2016/0103275 A1 Apr. 14, 2016

Related U.S. Application Data

(60) Provisional application No. 62/061,512, filed on Oct. 8, 2014.

(51) Int. Cl.
| | | |
|---|---|---|
| *A47F 3/04* | (2006.01) | |
| *G02F 1/13357* | (2006.01) | |
| *A47F 11/10* | (2006.01) | |
| *F21V 8/00* | (2006.01) | |

(52) U.S. Cl.
CPC ...... *G02F 1/133603* (2013.01); *A47F 3/0404* (2013.01); *A47F 3/0434* (2013.01); *A47F 11/10* (2013.01); *G02B 6/0091* (2013.01)

(58) Field of Classification Search
CPC ...... G02B 6/0773; G02B 6/0073; G02B 6/00; A47F 3/04; A47F 3/0434; A47F 11/10; A47F 3/0404; G02F 1/133603
See application file for complete search history.

(56) References Cited

U.S. PATENT DOCUMENTS

| | | |
|---|---|---|
| 1,812,919 A | 7/1931 | Balder |
| 3,510,973 A | 5/1970 | Mazzocco, Sr. |
| 4,040,726 A | 8/1977 | Paca |
| | (Continued) | |

FOREIGN PATENT DOCUMENTS

| | | |
|---|---|---|
| AU | 2004283319 A1 | 5/2005 |
| AU | 2007216782 A1 | 9/2007 |
| | (Continued) | |

OTHER PUBLICATIONS

Wikipedia, Gradient-index optics, 2016.
(Continued)

*Primary Examiner* — Thanh Nhan P Nguyen
(74) *Attorney, Agent, or Firm* — Standley Law Group LLP; Jeffrey S. Standley; Adam J. Smith

(57) ABSTRACT

The exemplary embodiments disclosed herein provide a transparent LCD which is placed between a front glass and a rear glass. A light guide is preferably positioned behind the LCD and contains an edge. A plurality of LEDs are positioned adjacent to the edge and a cavity is positioned on the opposite side of the LEDs as the light guide. Generally, light which is exiting the LEDs is permitted to enter both the light guide as well as the cavity. A graphic may be placed in front of the cavity and could be bonded to the front glass.

18 Claims, 7 Drawing Sheets

(56) References Cited

U.S. PATENT DOCUMENTS

| | | |
|---|---|---|
| 4,257,084 A | 3/1981 | Reynolds |
| 4,299,092 A | 11/1981 | Ibrahim |
| 4,738,042 A | 4/1988 | Corden et al. |
| 4,804,953 A | 2/1989 | Castleberry |
| 4,853,678 A | 8/1989 | Bishop, Jr. et al. |
| 5,040,878 A | 8/1991 | Eichenlaub |
| 5,046,805 A | 9/1991 | Simon |
| 5,066,106 A | 11/1991 | Sakamoto et al. |
| 5,363,149 A | 11/1994 | Furuno et al. |
| 5,440,324 A | 8/1995 | Strickling, III et al. |
| 5,453,855 A | 9/1995 | Nakamura et al. |
| 5,528,720 A | 6/1996 | Winston et al. |
| 5,598,068 A | 1/1997 | Shirai |
| 5,661,578 A | 8/1997 | Habing et al. |
| 5,856,854 A | 1/1999 | Hyun |
| 6,027,222 A | 2/2000 | Oki et al. |
| 6,166,389 A | 12/2000 | Shie et al. |
| 6,307,216 B1 | 10/2001 | Huh et al. |
| 6,400,101 B1 | 6/2002 | Biebl et al. |
| 6,419,372 B1 | 7/2002 | Shaw et al. |
| 6,421,103 B2 | 7/2002 | Yamaguchi |
| 6,481,130 B1 | 11/2002 | Wu |
| 6,601,984 B2 | 8/2003 | Yamamoto et al. |
| 6,636,003 B2 | 10/2003 | Rahm et al. |
| 6,762,815 B2 | 7/2004 | Lee |
| 6,789,921 B1 | 9/2004 | Deloy et al. |
| 6,805,468 B2 | 10/2004 | Itoh et al. |
| 6,842,204 B1 | 1/2005 | Johnson |
| 6,860,628 B2 | 3/2005 | Robertson et al. |
| 6,936,968 B2 | 8/2005 | Cross et al. |
| 6,949,772 B2 | 9/2005 | Shimizu et al. |
| 6,958,743 B2 | 10/2005 | Shin et al. |
| 7,012,379 B1 | 3/2006 | Chambers et al. |
| 7,015,650 B2 | 3/2006 | McGrath |
| 7,018,054 B2 | 3/2006 | Miyashita et al. |
| 7,025,474 B2 | 4/2006 | Campbell et al. |
| 7,038,186 B2 | 5/2006 | De Brabander et al. |
| 7,040,794 B2 | 5/2006 | Bernard |
| 7,045,828 B2 | 5/2006 | Shimizu et al. |
| 7,049,761 B2 | 5/2006 | Timmermans et al. |
| 7,053,557 B2 | 5/2006 | Cross et al. |
| 7,057,590 B2 | 6/2006 | Lim et al. |
| 7,210,839 B2 | 5/2007 | Jung et al |
| 7,218,812 B2 | 5/2007 | Maxwell et al. |
| 7,250,637 B2 | 7/2007 | Shimizu et al. |
| 7,259,403 B2 | 8/2007 | Shimizu et al. |
| 7,307,391 B2 | 12/2007 | Shan |
| 7,307,614 B2 | 12/2007 | Vinn |
| 7,347,706 B1 | 3/2008 | Wu et al. |
| 7,352,940 B2 | 4/2008 | Charters et al. |
| 7,375,381 B2 | 5/2008 | Shimizu et al. |
| 7,421,167 B2 | 9/2008 | Charters et al. |
| 7,473,019 B2 | 1/2009 | Laski |
| 7,481,553 B2 | 1/2009 | Kim et al. |
| 7,481,566 B2 | 1/2009 | Han |
| 7,510,299 B2 | 3/2009 | Timmermans et al. |
| 7,513,637 B2 | 4/2009 | Kelly et al. |
| 7,546,009 B2 | 6/2009 | Kukulj et al. |
| 7,738,746 B2 | 6/2010 | Charters et al. |
| 7,781,979 B2 | 8/2010 | Lys |
| 7,795,574 B2 | 9/2010 | Kennedy et al. |
| 7,813,694 B2 | 10/2010 | Fishman et al. |
| 7,922,381 B2 | 4/2011 | Han et al. |
| 7,982,706 B2 | 7/2011 | Ichikawa et al. |
| 8,021,900 B2 | 9/2011 | Maxwell et al. |
| 8,064,744 B2 | 11/2011 | Atkins et al. |
| 8,120,595 B2 | 2/2012 | Kukulj et al. |
| 8,194,031 B2 | 6/2012 | Yao et al. |
| 8,254,121 B2 | 8/2012 | Lee et al. |
| 8,274,626 B2 | 9/2012 | Choi et al. |
| 8,294,168 B2 | 10/2012 | Park et al. |
| 8,351,013 B2 | 1/2013 | Dunn et al. |
| 8,400,430 B2 | 3/2013 | Dunn et al. |
| 8,417,376 B1 | 4/2013 | Smolen |
| 8,529,993 B2 | 9/2013 | Charters et al. |
| 8,648,993 B2 | 2/2014 | Dunn et al. |
| 8,674,390 B2 | 3/2014 | Harris et al. |
| 8,674,963 B2 | 3/2014 | Cornish et al. |
| 8,683,745 B2 | 4/2014 | Artwohl et al. |
| 8,803,790 B2 | 8/2014 | Wasinger et al. |
| 8,842,366 B2 | 9/2014 | Arnett et al. |
| 8,982,013 B2 | 3/2015 | Sako et al. |
| 8,988,635 B2 | 3/2015 | Dunn et al. |
| 9,052,536 B2 | 6/2015 | Artwohl et al. |
| 9,155,405 B2 | 10/2015 | Artwohl et al. |
| 9,348,174 B2 | 5/2016 | Dunn et al. |
| 9,500,801 B2 | 11/2016 | Dunn |
| 9,500,896 B2 | 11/2016 | Dunn et al. |
| 9,514,661 B2 | 12/2016 | Riegel |
| 9,519,185 B2 | 12/2016 | Dunn et al. |
| 9,526,352 B2 | 12/2016 | Dunn et al. |
| 9,535,293 B2 | 1/2017 | Dunn |
| 9,633,366 B2 | 4/2017 | Dunn |
| 9,661,939 B2 | 5/2017 | Dunn et al. |
| 9,684,124 B2 | 6/2017 | Dunn |
| 9,733,420 B2 | 8/2017 | Dunn et al. |
| 2001/0009508 A1 | 7/2001 | Umemoto et al. |
| 2001/0033726 A1 | 10/2001 | Shie |
| 2002/0043012 A1 | 4/2002 | Shibata et al. |
| 2002/0075552 A1 | 6/2002 | Poll et al. |
| 2002/0126078 A1 | 9/2002 | Horibe et al. |
| 2002/0187575 A1 | 12/2002 | Maruyama et al. |
| 2003/0026085 A1 | 2/2003 | Ueda et al. |
| 2003/0227428 A1 | 12/2003 | Nose |
| 2004/0062029 A1 | 4/2004 | Ato |
| 2004/0113044 A1 | 6/2004 | Ishiguchi |
| 2005/0094391 A1 | 5/2005 | Campbell et al. |
| 2005/0117323 A1 | 6/2005 | King |
| 2005/0140848 A1 | 6/2005 | Yoo et al. |
| 2005/0162737 A1 | 7/2005 | Whitehead et al. |
| 2005/0265019 A1 | 12/2005 | Sommers et al. |
| 2006/0012985 A1 | 1/2006 | Archie, Jr. et al. |
| 2006/0055012 A1 | 3/2006 | Hsin Chen et al. |
| 2006/0082700 A1 | 4/2006 | Gehlsen et al. |
| 2006/0087521 A1 | 4/2006 | Chu et al. |
| 2006/0092346 A1 | 5/2006 | Moon et al. |
| 2006/0092348 A1 | 5/2006 | Park |
| 2006/0125418 A1 | 6/2006 | Bourgault |
| 2006/0197474 A1 | 9/2006 | Olsen |
| 2006/0221612 A1 | 10/2006 | Song et al. |
| 2006/0238367 A1 | 10/2006 | Tsuchiya |
| 2006/0262079 A1 | 11/2006 | Seong et al. |
| 2006/0279946 A1 | 12/2006 | Park et al. |
| 2006/0284788 A1 | 12/2006 | Robinson et al. |
| 2006/0289201 A1 | 12/2006 | Kim et al. |
| 2007/0013828 A1 | 1/2007 | Cho et al. |
| 2007/0097321 A1 | 5/2007 | Whitehead et al. |
| 2007/0115686 A1 | 5/2007 | Tyberghien |
| 2007/0139574 A1 | 6/2007 | Ko et al. |
| 2007/0139929 A1 | 6/2007 | Yoo et al. |
| 2007/0147037 A1 | 6/2007 | Wang |
| 2007/0151274 A1 | 7/2007 | Roche et al. |
| 2007/0153515 A1 | 7/2007 | Hong et al. |
| 2007/0171353 A1 | 7/2007 | Hong |
| 2007/0171623 A1 | 7/2007 | Zagar et al. |
| 2007/0171647 A1 | 7/2007 | Artwohl et al. |
| 2007/0195535 A1 | 8/2007 | Artwohl et al. |
| 2007/0206158 A1 | 9/2007 | Kinoshita et al. |
| 2007/0214812 A1 | 9/2007 | Wagner et al. |
| 2007/0230218 A1 | 10/2007 | Jachim et al. |
| 2007/0268234 A1 | 11/2007 | Wakabayashi et al. |
| 2007/0288332 A1 | 12/2007 | Naito |
| 2007/0297163 A1 | 12/2007 | Kim et al. |
| 2008/0036940 A1 | 2/2008 | Song et al. |
| 2008/0043463 A1 | 2/2008 | Park et al. |
| 2008/0049164 A1 | 2/2008 | Jeon et al. |
| 2008/0055534 A1 | 3/2008 | Kawano |
| 2008/0068836 A1 | 3/2008 | Hatanaka et al. |
| 2008/0089064 A1 | 4/2008 | Wang |
| 2008/0101086 A1 | 5/2008 | Lee |
| 2008/0106527 A1 | 5/2008 | Cornish et al. |
| 2008/0111949 A1 | 5/2008 | Shibata et al. |
| 2008/0143916 A1 | 6/2008 | Fujino et al. |
| 2008/0151527 A1 | 6/2008 | Ueno et al. |

(56) References Cited

U.S. PATENT DOCUMENTS

| | | |
|---|---|---|
| 2008/0165526 A1* | 7/2008 | Saraiji ............... A47F 3/001 362/125 |
| 2008/0170178 A1 | 7/2008 | Kubota et al. |
| 2008/0170400 A1 | 7/2008 | Maruyama |
| 2008/0212305 A1 | 9/2008 | Kawana et al. |
| 2008/0231196 A1 | 9/2008 | Weng et al. |
| 2008/0276507 A1 | 11/2008 | Hines |
| 2008/0284942 A1 | 11/2008 | Mahama et al. |
| 2008/0295033 A1 | 11/2008 | Lee et al. |
| 2009/0002990 A1 | 1/2009 | Becker et al. |
| 2009/0009102 A1 | 1/2009 | Kahlman et al. |
| 2009/0015400 A1 | 1/2009 | Reed |
| 2009/0015755 A1 | 1/2009 | Bang et al. |
| 2009/0033612 A1 | 2/2009 | Roberts et al. |
| 2009/0058795 A1 | 3/2009 | Yamazaki |
| 2009/0085859 A1 | 4/2009 | Song |
| 2009/0091634 A1 | 4/2009 | Kennedy et al. |
| 2009/0097227 A1 | 4/2009 | Kim et al. |
| 2009/0135167 A1 | 5/2009 | Sakai et al. |
| 2009/0135583 A1 | 5/2009 | Hillman et al. |
| 2009/0174840 A1 | 7/2009 | Lee et al. |
| 2009/0196069 A1 | 8/2009 | Iwasaki |
| 2009/0213579 A1* | 8/2009 | Saraiji ............... A47F 3/001 362/126 |
| 2009/0243501 A1 | 10/2009 | Dunn et al. |
| 2009/0244884 A1 | 10/2009 | Trulaske, Jr. |
| 2009/0278766 A1 | 11/2009 | Sako et al. |
| 2009/0300953 A1 | 12/2009 | Frisch et al. |
| 2010/0102735 A1 | 4/2010 | Chang et al. |
| 2010/0109553 A1 | 5/2010 | Chang et al. |
| 2010/0162747 A1 | 7/2010 | Hamel et al. |
| 2010/0165240 A1 | 7/2010 | Cho et al. |
| 2010/0194296 A1 | 8/2010 | Park |
| 2010/0220258 A1 | 9/2010 | Dunn et al. |
| 2010/0238394 A1 | 9/2010 | Dunn |
| 2010/0307800 A1 | 12/2010 | Wee et al. |
| 2011/0007228 A1 | 1/2011 | Yoon et al. |
| 2011/0083460 A1 | 4/2011 | Thomas et al. |
| 2011/0102704 A1 | 5/2011 | Dunn et al. |
| 2011/0116000 A1 | 5/2011 | Dunn et al. |
| 2011/0116231 A1 | 5/2011 | Dunn et al. |
| 2011/0141724 A1 | 6/2011 | Erion |
| 2011/0164434 A1 | 7/2011 | Derichs |
| 2011/0205145 A1 | 8/2011 | Lin et al. |
| 2011/0242437 A1 | 10/2011 | Yoo et al. |
| 2011/0242839 A1 | 10/2011 | Dunn et al. |
| 2011/0302944 A1 | 12/2011 | Howington et al. |
| 2012/0050958 A1 | 3/2012 | Sanford et al. |
| 2012/0062080 A1 | 3/2012 | Maslen |
| 2012/0062819 A1 | 3/2012 | Dunn et al. |
| 2012/0098794 A1 | 4/2012 | Kleinert et al. |
| 2012/0105424 A1 | 5/2012 | Lee et al. |
| 2012/0105428 A1 | 5/2012 | Fleck et al. |
| 2012/0134139 A1 | 5/2012 | Jang et al. |
| 2012/0242926 A1 | 9/2012 | Hsu et al. |
| 2012/0250329 A1 | 10/2012 | Suehiro et al. |
| 2012/0274882 A1 | 11/2012 | Jung |
| 2012/0287368 A1 | 11/2012 | Que et al. |
| 2012/0314447 A1 | 12/2012 | Huang |
| 2012/0327039 A1 | 12/2012 | Kukulj |
| 2013/0016296 A1 | 1/2013 | Fujita et al. |
| 2013/0027633 A1 | 1/2013 | Park et al. |
| 2013/0063326 A1 | 3/2013 | Riegel |
| 2013/0094160 A1 | 4/2013 | Narumi |
| 2013/0120815 A1 | 5/2013 | Aspnes et al. |
| 2013/0151006 A1 | 6/2013 | Garson et al. |
| 2013/0158703 A1 | 6/2013 | Llin et al. |
| 2013/0163277 A1 | 6/2013 | Kim et al. |
| 2013/0208447 A1 | 8/2013 | Maslen |
| 2013/0211583 A1 | 8/2013 | Borra |
| 2013/0258659 A1 | 10/2013 | Erion |
| 2013/0265525 A1 | 10/2013 | Dunn et al. |
| 2013/0271696 A1 | 10/2013 | Dunn |
| 2013/0278868 A1 | 10/2013 | Dunn et al. |
| 2014/0016355 A1 | 1/2014 | Ajichi |
| 2014/0078407 A1 | 3/2014 | Green et al. |
| 2014/0085564 A1* | 3/2014 | Hendren ............ G02F 1/133385 349/58 |
| 2014/0104538 A1 | 4/2014 | Park et al. |
| 2014/0134767 A1 | 5/2014 | Ishida et al. |
| 2014/0144083 A1* | 5/2014 | Artwohl ............ A47F 3/0434 49/70 |
| 2014/0204452 A1 | 7/2014 | Branson |
| 2014/0268657 A1 | 9/2014 | Dunn et al. |
| 2014/0285732 A1 | 9/2014 | Tanabe et al. |
| 2014/0333541 A1 | 11/2014 | Lee et al. |
| 2014/0361969 A1 | 12/2014 | Wasinger et al. |
| 2015/0009653 A1 | 1/2015 | Dunn et al. |
| 2015/0035432 A1 | 2/2015 | Kendall et al. |
| 2015/0153506 A1 | 6/2015 | Dunn |
| 2015/0177480 A1 | 6/2015 | Bullock et al. |
| 2015/0219954 A1 | 8/2015 | Kubo |
| 2015/0226996 A1 | 8/2015 | Ohashi |
| 2015/0247968 A1* | 9/2015 | Verrat-Debailleul ........................ B60Q 1/268 362/612 |
| 2015/0250021 A1 | 9/2015 | Stice et al. |
| 2015/0253612 A1 | 9/2015 | Hasegawa et al. |
| 2015/0300628 A1 | 10/2015 | Dunn et al. |
| 2015/0309263 A2 | 10/2015 | Abovitz et al. |
| 2015/0346525 A1 | 12/2015 | Wolf et al. |
| 2015/0362667 A1 | 12/2015 | Dunn |
| 2015/0362768 A1* | 12/2015 | Dunn ................ G02F 1/1339 349/65 |
| 2015/0362792 A1 | 12/2015 | Dunn et al. |
| 2015/0363819 A1 | 12/2015 | Dunn |
| 2015/0366083 A1 | 12/2015 | Dunn et al. |
| 2016/0037657 A1 | 2/2016 | Yoshizumi |
| 2016/0061514 A1 | 3/2016 | Seo et al. |
| 2016/0091755 A1 | 3/2016 | Dunn |
| 2016/0095450 A1 | 4/2016 | Trulaske, Sr. |
| 2016/0103275 A1 | 4/2016 | Diaz et al. |
| 2016/0106231 A1 | 4/2016 | Dunn et al. |
| 2016/0192451 A1 | 6/2016 | Dunn et al. |
| 2016/0238876 A1 | 8/2016 | Dunn et al. |
| 2017/0059938 A1 | 3/2017 | Brown et al. |
| 2017/0068042 A1 | 3/2017 | Dunn et al. |
| 2017/0068044 A1 | 3/2017 | Dunn |
| 2017/0099960 A1 | 4/2017 | Dunn et al. |
| 2017/0108735 A1 | 4/2017 | Dunn |
| 2017/0228770 A1 | 8/2017 | Dunn |
| 2017/0248823 A1 | 8/2017 | Dunn et al. |
| 2017/0256115 A1 | 9/2017 | Diaz |

FOREIGN PATENT DOCUMENTS

| | | |
|---|---|---|
| CA | 2536130 A1 | 5/2005 |
| CA | 2688214 A1 | 11/2008 |
| CA | 2815355 A1 | 5/2012 |
| CN | 1836179 A | 9/2006 |
| CN | 101432647 B | 5/2007 |
| CN | 101048685 A | 10/2007 |
| CN | 101339272 A | 1/2009 |
| CN | 101351765 A | 1/2009 |
| CN | 101681222 A | 3/2010 |
| CN | 202815379 U | 3/2013 |
| CN | CA202815379 | 3/2013 |
| EP | 0313331 | 4/1989 |
| EP | 1678534 A1 | 7/2006 |
| EP | 1805539 A1 | 7/2007 |
| EP | 2156276 A4 | 5/2008 |
| EP | 1941342 A1 | 7/2008 |
| EP | 3155607 A1 | 4/2017 |
| IN | 30/2007 | 2/2006 |
| IN | 03/2009 | 5/2008 |
| IN | 15/2010 | 12/2009 |
| JP | 11095214 A | 4/1999 |
| JP | 2002064842 | 2/2002 |
| JP | 2002209230 | 7/2002 |
| JP | 2004004581 A | 1/2004 |
| JP | 2007509372 B2 | 10/2004 |
| JP | 2005228996 A | 8/2005 |
| JP | 2005236469 | 9/2005 |

(56) References Cited

FOREIGN PATENT DOCUMENTS

| | | |
|---|---|---|
| JP | 2008518251 A | 10/2005 |
| JP | 2007080872 A | 3/2007 |
| JP | 2009535723 A5 | 5/2007 |
| JP | 2008112719 A | 5/2008 |
| JP | 2008256819 A | 10/2008 |
| JP | 2009036964 A | 2/2009 |
| JP | 2009512898 A | 3/2009 |
| JP | 2009231473 A | 10/2009 |
| JP | 2010509622 A | 3/2010 |
| JP | 2010527100 A | 8/2010 |
| JP | 2011081424 A | 4/2011 |
| JP | 5173088 B1 | 3/2013 |
| KR | 1020040045939 A | 6/2004 |
| KR | 1020070003755 A | 2/2006 |
| KR | 1020070084554 A | 5/2007 |
| KR | 20080013592 A | 2/2008 |
| KR | 20080063414 A | 7/2008 |
| KR | 20080074972 A | 8/2008 |
| KR | 1020090007776 A | 1/2009 |
| KR | 20100019997 A | 2/2010 |
| KR | 20120044874 A | 5/2012 |
| KR | 1020050033986 A | 4/2014 |
| TW | 200615598 A | 5/2006 |
| TW | 200802054 A | 1/2008 |
| TW | 200808925 A | 2/2008 |
| TW | 200809285 A | 2/2008 |
| TW | 200809287 A | 2/2008 |
| TW | 200828093 A | 7/2008 |
| TW | 200912200 A | 3/2009 |
| TW | 201030376 A | 8/2010 |
| TW | 201038114 A | 10/2010 |
| WO | WO9608892 | 3/1996 |
| WO | WO2005051054 A2 | 6/2005 |
| WO | WO2006001559 A1 | 1/2006 |
| WO | WO2006109237 A1 | 10/2006 |
| WO | WO2007052777 A1 | 5/2007 |
| WO | WO2005040873 A1 | 5/2008 |
| WO | WO2008138049 A | 11/2008 |
| WO | WO2009004574 A1 | 1/2009 |
| WO | WO2010080624 | 7/2010 |
| WO | WO2010129271 A2 | 11/2010 |
| WO | WO2011100429 A2 | 8/2011 |
| WO | WO2011143719 | 11/2011 |
| WO | WO2013056109 A1 | 4/2013 |
| WO | WO2014158642 A1 | 10/2014 |
| WO | WO2015003130 A1 | 1/2015 |
| WO | 2015195681 A1 | 12/2015 |
| WO | WO2015195681 A1 | 12/2015 |
| WO | WO2017151934 A1 | 9/2017 |

OTHER PUBLICATIONS

Patrick Frantz & Deania Fernandez, Printed Circuit Boards (PCBs), Feb. 18, 2004, 2 Pages, Version 1.1.
Teravision Corp., LCD-TV Panel Control Board Specification, Nov. 2007, 24 Pages.
Supertex Inc., Constant Off-time, Buck-based LED Drivers Using HV9910, Nov. 2, 2004, 4 Pages.
Grin Tech, Grin Lenses, Aug. 25, 2016, 4 Pages.
Supertex Inc., Universal High Brightness LED Driver, 2007, 8 Pages.
Shigeru Aoyama, Akihiro Funamoto & Koichi Imanaka, Hybrid normal-reverse prism coupler for light-emitting diode backlight systems, Oct. 1, 2006, 6 Pages, vol. 45, No. 28.
Panel-Brite, Inc., High Brightness LED Backlight Technology, Mar. 11, 2009, 1 Page.
RPO, How Digital Waveguide Touch Works, Sep. 15, 2011, 1 Page.
Dave Roos, How Transmissive Film Works, article, 2008, 9 pages.
Schott, Glass made of Ideas—OPALIKA, 2016, 2 pages.
A. Vogler & H. Kunkley, Photochemistry and Beer, Jan. 1982, 3 Pages, vol. 59, No. 1.
Pilkington TEC Glass, for the Refrigeration Market, 2002, 2 Pages.

\* cited by examiner

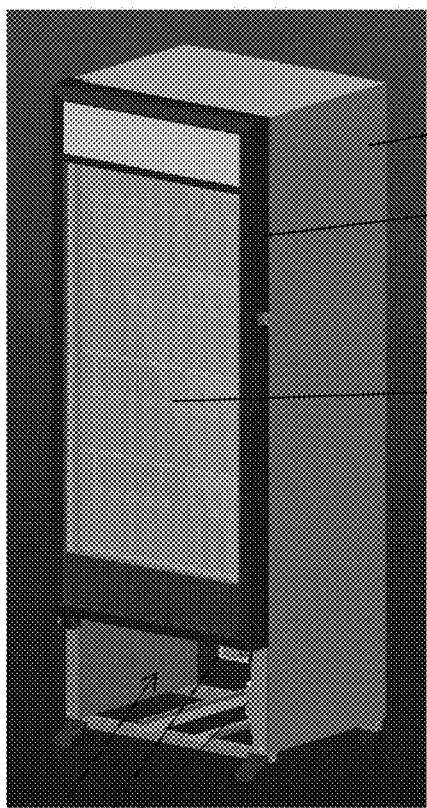
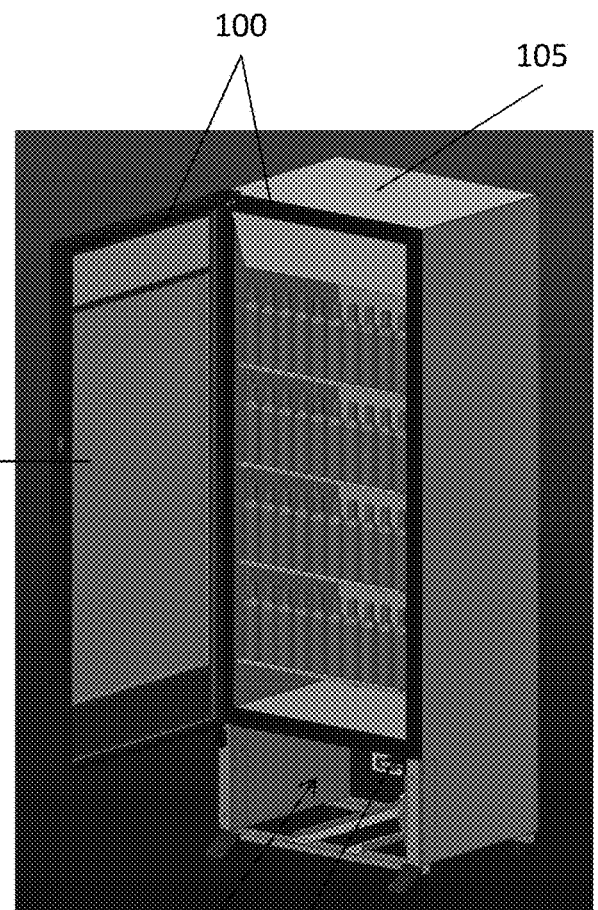

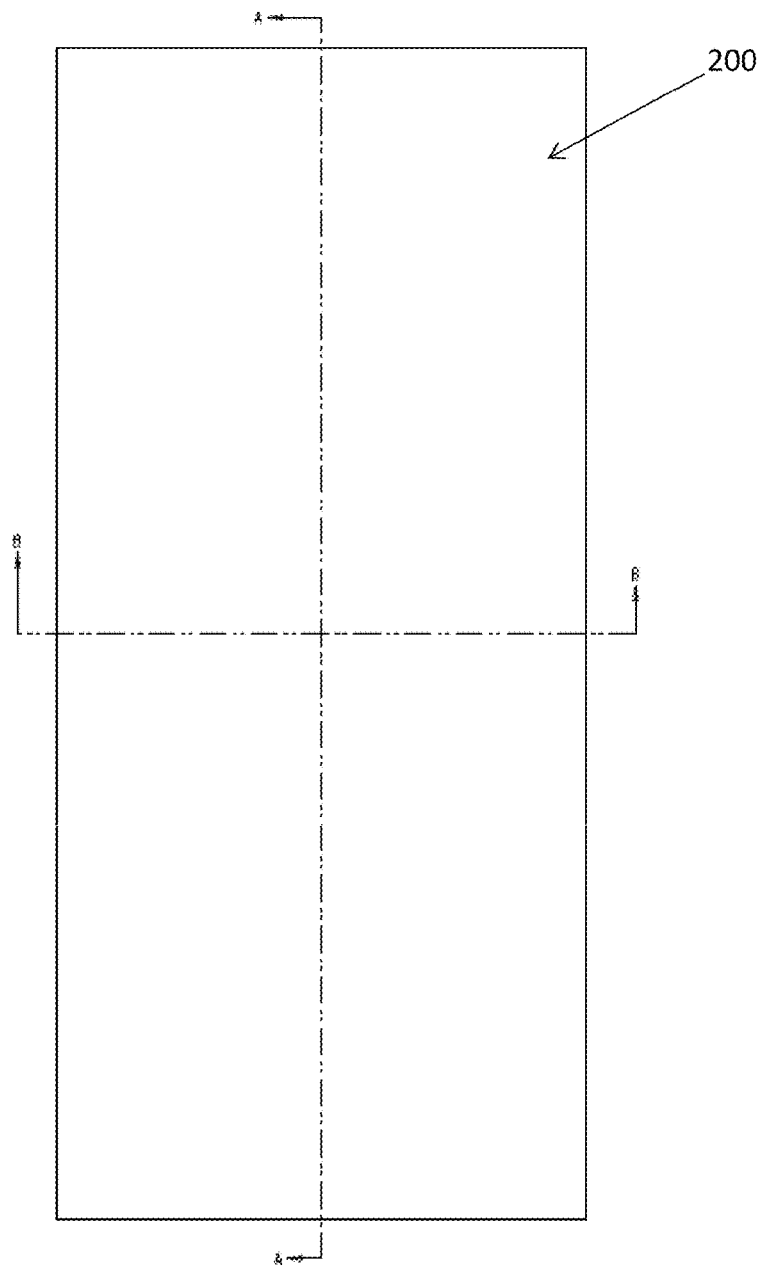
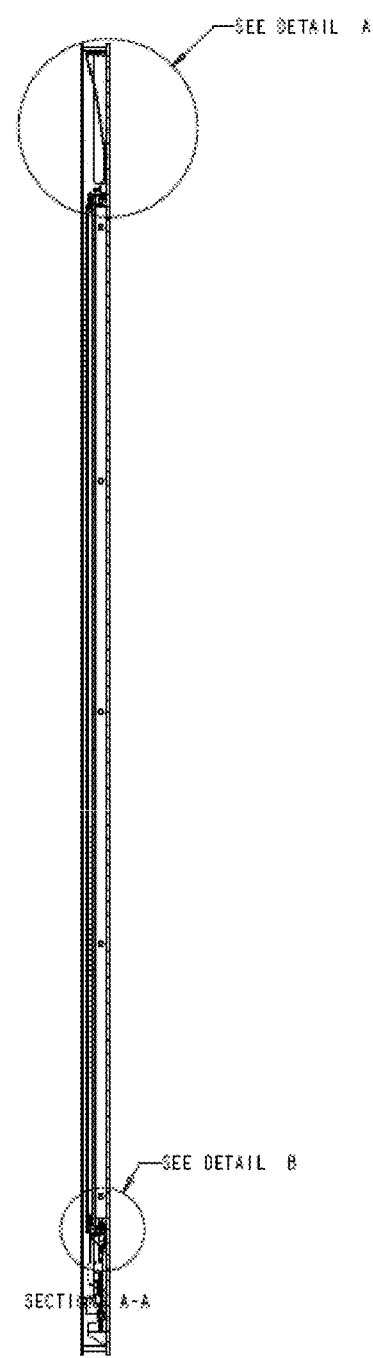
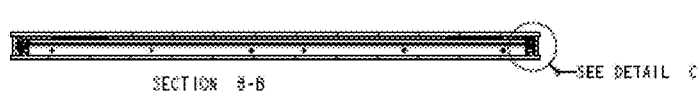
FIG - 4
FIG - 5
FIG - 6

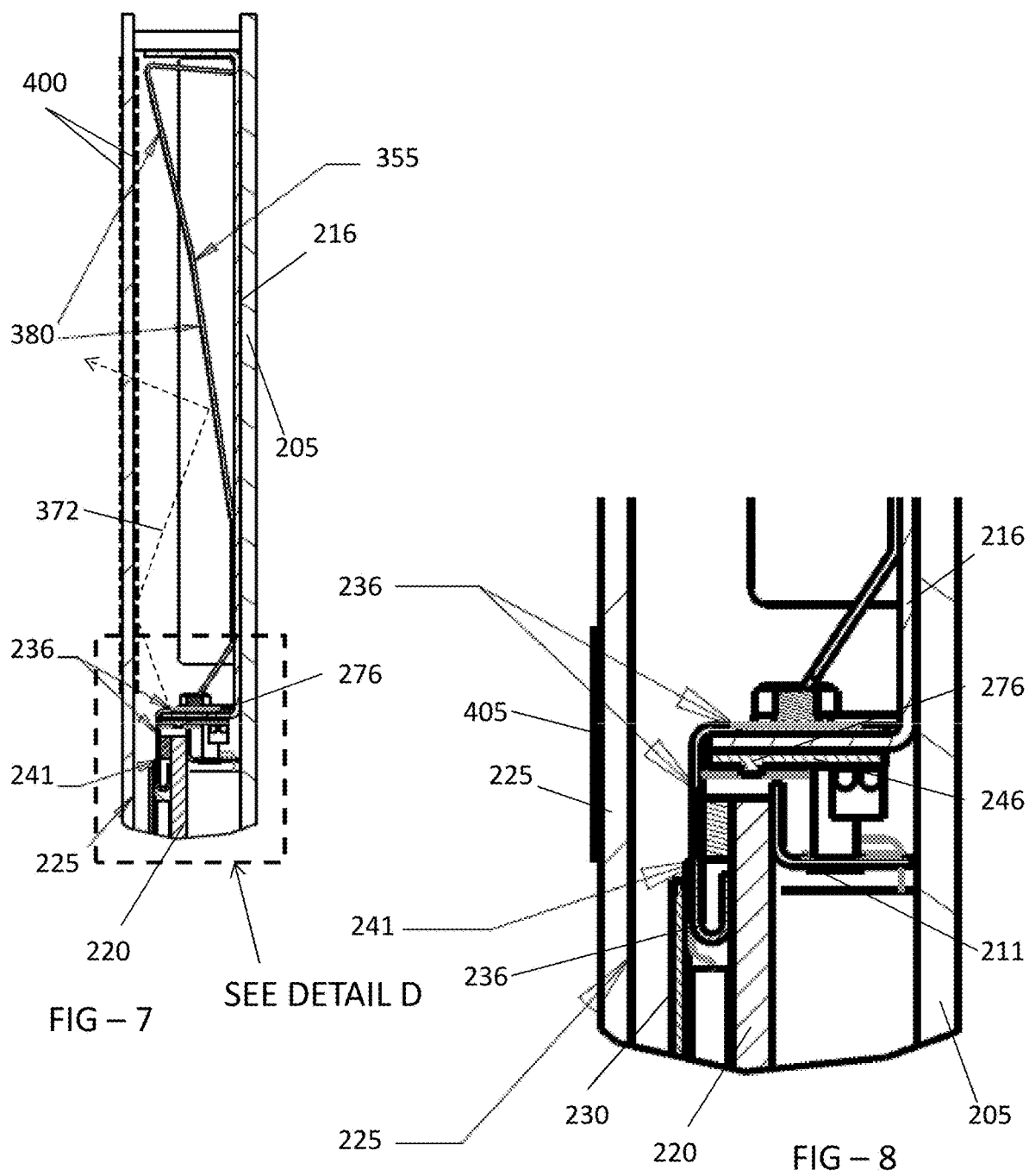

LED ASSEMBLY FOR TRANSPARENT LIQUID CRYSTAL DISPLAY AND STATIC GRAPHIC

CROSS-REFERENCE TO RELATED APPLICATIONS

This application claims priority to U.S. Application No. 62/061,512 filed on Oct. 8, 2014 and is herein incorporated by reference in its entirety.

TECHNICAL FIELD

Embodiments generally relate to LED assemblies for transparent liquid crystal displays (LCD).

BACKGROUND OF THE ART

Display cases are used in a number of different retail establishments for illustrating the products that are available for sale. In some instances these display cases may be coolers or freezers which are placed in grocery stores, convenience stores, gas stations, restaurants, or other retail establishments. In other instances these display cases may be non-refrigerated transparent containers used in a jewelry or watch store, bakery, deli, antique shop, sporting goods store, electronics store, or other retail establishments. While the design and appearance of the product itself does provide some point-of-sale (POS) advertising, it has been found that additional advertising at the POS can increase the awareness of a product and in turn create additional sales.

Most retail establishments already contain some POS advertising, and depending on the type of establishment the proprietor may want to limit the amount of 'clutter' in the retail area—resulting in a very limited space for additional POS advertising. It has now become desirable to utilize the transparent glass that is typically placed in display cases with additional POS advertising. Most notably, it has been considered that transparent LCDs may be positioned along with the transparent glass and could display additional advertising materials while still allowing a patron to view the products inside the display case.

SUMMARY OF THE EXEMPLARY EMBODIMENTS

An exemplary embodiment provides an LED assembly for a transparent LCD assembly. LEDs are preferably arranged along the top and bottom edges of a two way light guide which permits the light to exit both the front and rear surface of the light guide. The top LEDs are preferably placed in thermal communication with a top thermal plate which is placed in conductive thermal communication with the rear glass. Similarly, the bottom LEDs are preferably placed in thermal communication with a bottom thermal plate which is also placed in conductive thermal communication with the rear glass. The light guide is preferably sandwiched between a front and rear bracket but is permitted to float up/down or left/right (as one observes the image on the LCD) to account for thermal expansion/contraction of the light guide.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 1 is a perspective view of a refrigerated display case having an exemplary sealed transparent LCD assembly.

FIG. 2 is a perspective view of the refrigerated display case of FIG. 1 where the door has been opened.

FIG. 4 is a front planar view of the sealed transparent LCD assembly, showing the section lines A-A and B-B.

FIG. 5 is a section view taken along the section line A-A shown in FIG. 4 and indicating Detail A and Detail B.

FIG. 6 is a section view taken along the section line B-B shown in FIG. 4 and indicating Detail C.

FIG. 7 is a detailed section view of Detail A shown in FIG. 5.

FIG. 8 is a detailed section view of Detail D shown in FIG. 7.

DETAILED DESCRIPTION

Figure 3:
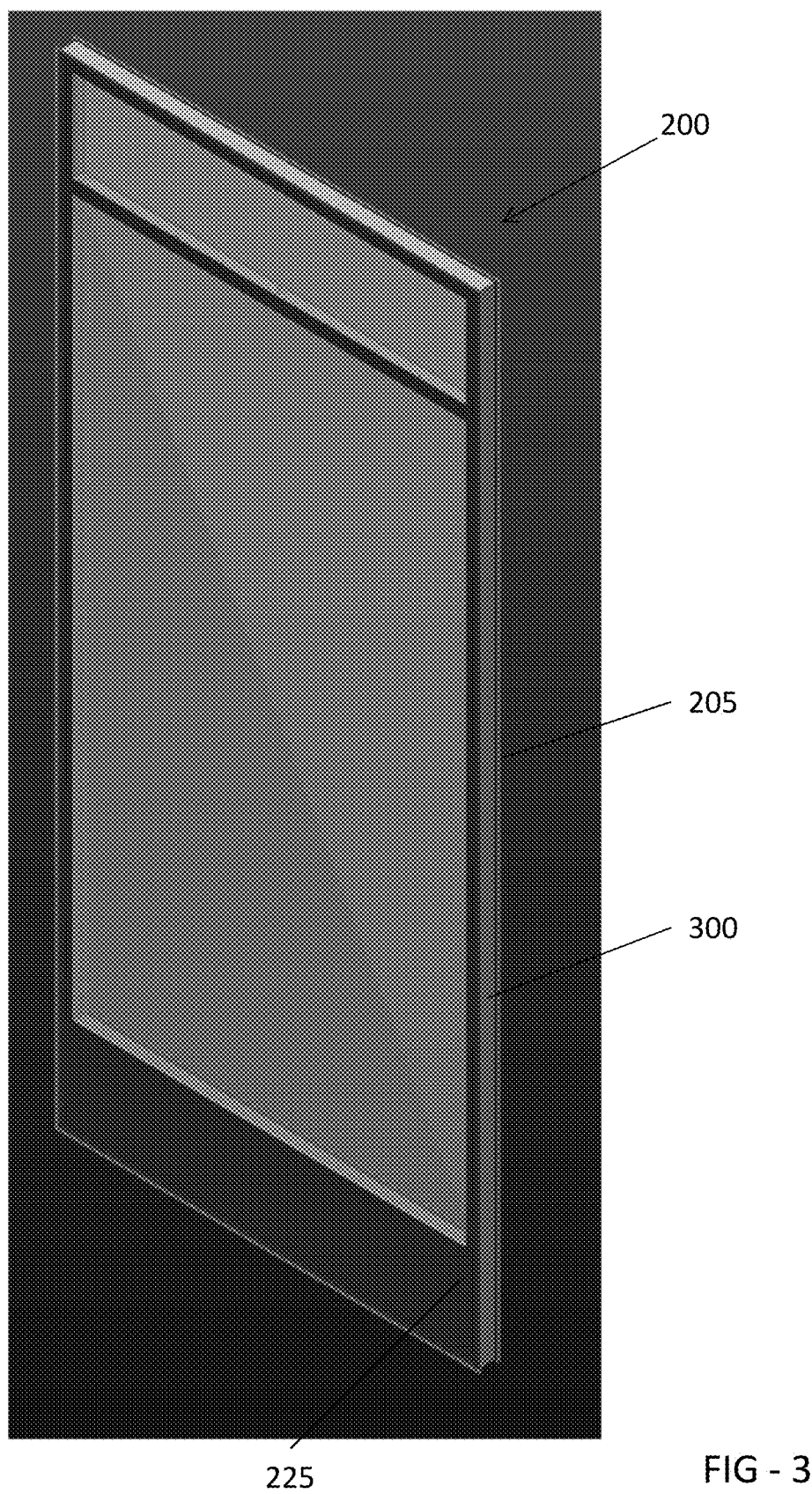
FIG. 3 is a perspective view of the sealed transparent LCD assembly of FIGS. 1-2.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a refrigerated display case having an exemplary sealed transparent LCD assembly 200. Generally, the display case includes a housing 105, to which a door frame assembly 100 is fastened. In this embodiment, a cavity 110 is provided below the door frame assembly 100 where various electronic devices 111 for operating the transparent LCD assembly 200 can be located. The electrical devices 111 may include any or all of the following: timing and control board (TCON), video player, hard drive/storage, microprocessor/CPU, wireless transmitter/receiver, cellular data transmitter/receiver, and internet connectivity. At least some of the electrical devices 111 are in electrical communication with the transparent LCD 200.

FIG. 2 is a perspective view of the refrigerated display case of FIG. 1 where the door has been opened.

FIG. 3 is a perspective view of the sealed transparent LCD assembly 200 of FIGS. 1-2. Generally speaking, the assembly includes a spacer 300 which is sandwiched between a front glass 225 and rear glass 205. These components are preferably sealed together with an inert gas filling the sealed enclosure. Although not required for every embodiment, argon gas has been found to be preferred in the exemplary embodiments. For sealing these components together, it is preferable to use a hot melt polyurethane. Preferably, the spacer 300 is the Super Spacer® Standard from Quanex in Cambridge, Ohio www.quanex.com. In an exemplary embodiment, the spacer 300 would be a flexible foam that contains a desiccant and has a pressure sensitive acrylic adhesive on the front and back edges of the spacer which would be used to bond with the front and rear glass.

FIG. 4 is a front planar view of the sealed transparent LCD assembly 200, showing the section lines A-A and B-B. FIG. 5 is a section view taken along the section line A-A shown in FIG. 4 and indicating Detail A and Detail B. FIG. 6 is a section view taken along the section line B-B shown in FIG. 4 and indicating Detail C.

FIG. 7 is a detailed section view of Detail A shown in FIG. 5 while FIG. 8 is a detailed view of Detail D shown in FIG. 7. A top thermal plate 216 is preferably bonded to the rear glass 205. In an exemplary embodiment, the top thermal plate 216 is preferably bonded to the rear glass 205 through adhesive transfer tape. An exemplary adhesive transfer tape for this purpose would be 468 MP, available commercially from 3M™ of St. Paul, Minn. www.3M.com/converter. A printed circuit board (PCB) 246 containing a plurality of LEDs 276 is preferably attached to the top thermal plate 216 and is preferably in conductive thermal communication with the top thermal plate 216 as well. In this way, heat that is generated by the LEDs 276 can be transmitted to the PCB 246, top thermal plate 216, and eventually transferring to the rear glass 205 where the heat can dissipate through natural or forced convection.

The LEDs 276 are placed adjacent to the edge of a light guide 220 which is sandwiched between a rear bracket 211 and a front bracket 236. Generally speaking, the light guide 220 is only constrained from movement towards the front or back of the assembly, but is not constrained from movement towards the top or sides of the assembly. In other words, the light guide 220 should be secured such that it is capable of thermal expansion/contraction in the X-Y direction (horizontal and vertical when observing the LCD), but is fixed in the Z direction (into/out of the assembly when observing the LCD). It could also be said that the light guide 220 is preferably constrained so that it cannot move towards the front or rear glass but otherwise is permitted to float between the rear bracket 211 and front bracket 236. In an exemplary embodiment, the light guide 220 would be the Acrylite® LED Endlighten product available from Evonik Industries. www.acrylite-shop.com.

Preferably, the light guide 220 would contain microscopic diffuse particulate that is homogeneously scattered throughout the sheet. Also preferably, the light emitted from the LEDs 276 and 275 is permitted to exit both the front and rear surfaces of the light guide 220 (in this way, the light guide 220 could be referred to as a 'two way light guide'). In an exemplary embodiment, the light is permitted to exit the rear of the light guide 220 so as to illuminate the products within the display case. Thus, it is preferable that the amount of light permitted to exit the rear surface of the light guide 220 is at least 20% of the amount of light permitted to exit the front surface of the light guide 220.

The transparent LCD 230 is preferably attached to a front surface of the front bracket 236 through a layer of adhesive 241 which would preferably be applied around the perimeter of the LCD 230. In an exemplary embodiment, the adhesive 241 would be VHB tape and preferably 5052 VHB Tape available commercially from 3M™ of St. Paul, Minn. www.3M.com.

Figure 10:
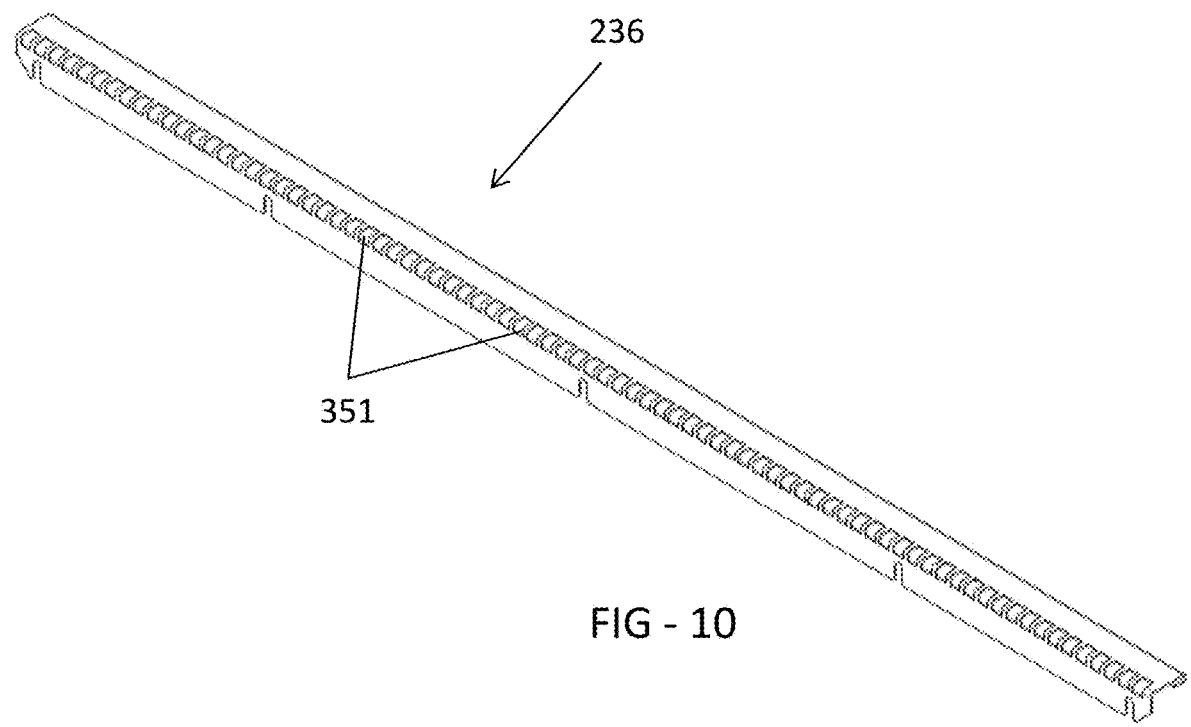
FIG. 10 is a perspective view of an exemplary embodiment of a front bracket when using the optional light bleeding technique.

In an exemplary embodiment, the front bracket 236 may contain a plurality of apertures 351 (see FIG. 10) which permit light 372 from the LEDs 276 to pass through the front bracket 236 and enter the area above the front bracket 236. In this way, some light from the LED 276 is permitted to enter a top cavity of the sealed transparent LCD assembly. The cavity may be defined by the space between a rear wall 355 and the front glass 225. The light 372 is permitted to reflect off the rear wall 355 and exit through the front glass 225. In some embodiments, a static graphic 400 may be placed on the front glass 225 (either the front surface or the rear surface) such that the light 372 which eventually exits out of the front glass 225 can illuminate the graphic 400. Thus, the apertures 351 which are contained within the front bracket 236 may allow the light 372 from the LED 276 to bleed off the main light guide 220 and be used to backlight the graphic 400. Preferably, the front surfaces 380 of the rear wall 355 are reflective.

A dark colored mask 405 may be applied to the front glass 225 to ensure that the light 372 from the LED 276 is not directly visible to an observer. The dark colored mask 405 is preferably black and may be bonded to either the interior or exterior surface of the front glass 225. Preferably, the mask 405 is placed along the line of sight of an intended observer who observes the LED 276, where the mask 405 is positioned between the intended observer and the LED 276.

Figure 9:
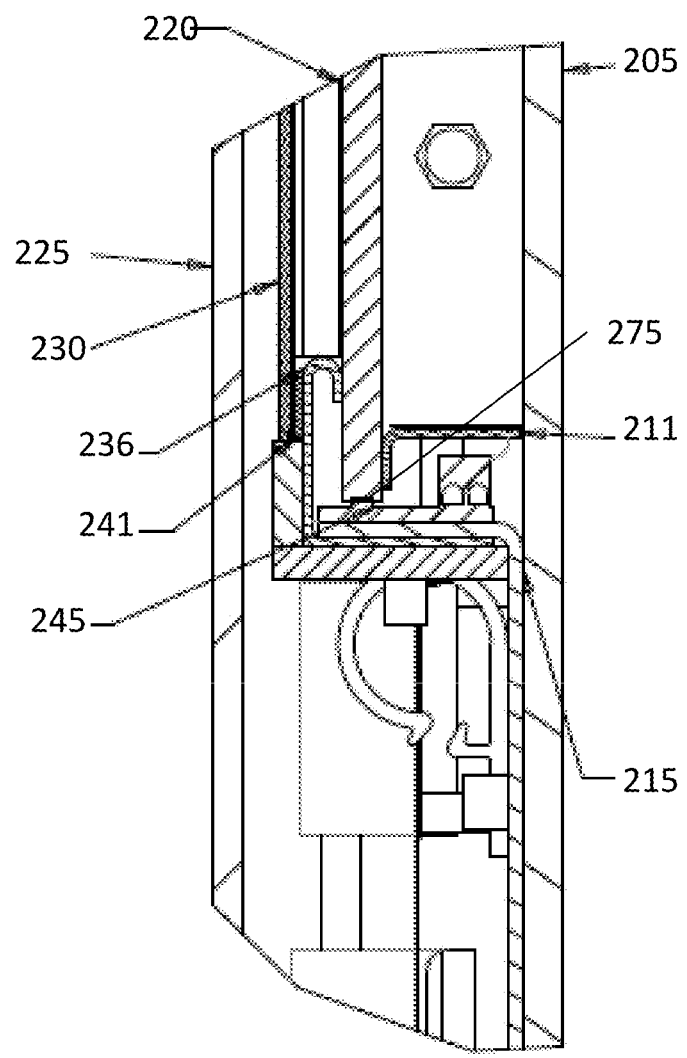
FIG. 9 is a detailed section view of Detail B shown in FIG. 5.

FIG. 9 is a detailed section view of Detail B shown in FIG. 5. A bottom thermal plate 215 is preferably bonded to the rear glass 205. In an exemplary embodiment, the bottom thermal plate 215 is preferably bonded to the rear glass 205 through adhesive transfer tape. An exemplary adhesive transfer tape for this purpose would be 468 MP, available commercially from 3M™ of St. Paul, Minn. www.3M.com/converter. A printed circuit board (PCB) 245 containing a plurality of LEDs 275 is preferably attached to the bottom thermal plate 215 and is preferably in conductive thermal communication with the bottom thermal plate 215 as well. In this way, heat that is generated by the LEDs 275 can be transmitted to the PCB 245, bottom thermal plate 215, and eventually transferring to the rear glass 205 where the heat can dissipate through natural or forced convection.

The LEDs 275 are placed adjacent to the edge of a light guide 220 which is sandwiched between a rear bracket 211 and a front bracket 236. As discussed at length above, the light guide 220 is preferably only constrained from movement towards the front or back of the assembly, but is not contained from movement towards the top or sides of the assembly. It should be noted that the front bracket 236 could also contain the apertures 351 so that light from the LED 275 may bleed into the cavity below front bracket 236, in order to illuminate a graphic that could be placed on the front glass 225 below the front bracket 236. While not shown here, static graphics could also be placed below the front bracket 236 with a rear wall 355 similar to what is shown and described above with reference to FIG. 7.

Figure 11:
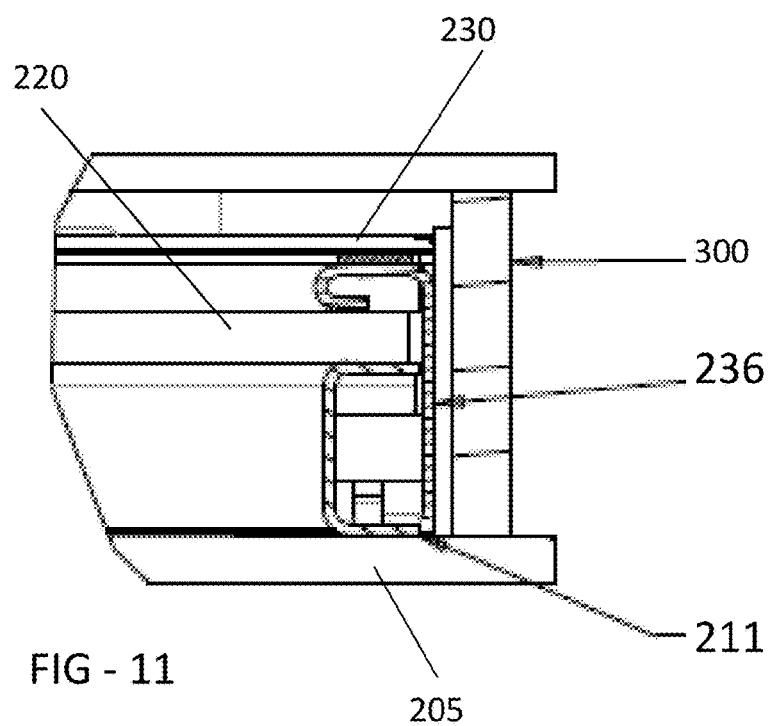
FIG. 11 is a detailed section view of Detail C shown in FIG. 6.

FIG. 11 is a detailed section view of Detail C shown in FIG. 6.

Figure 12:
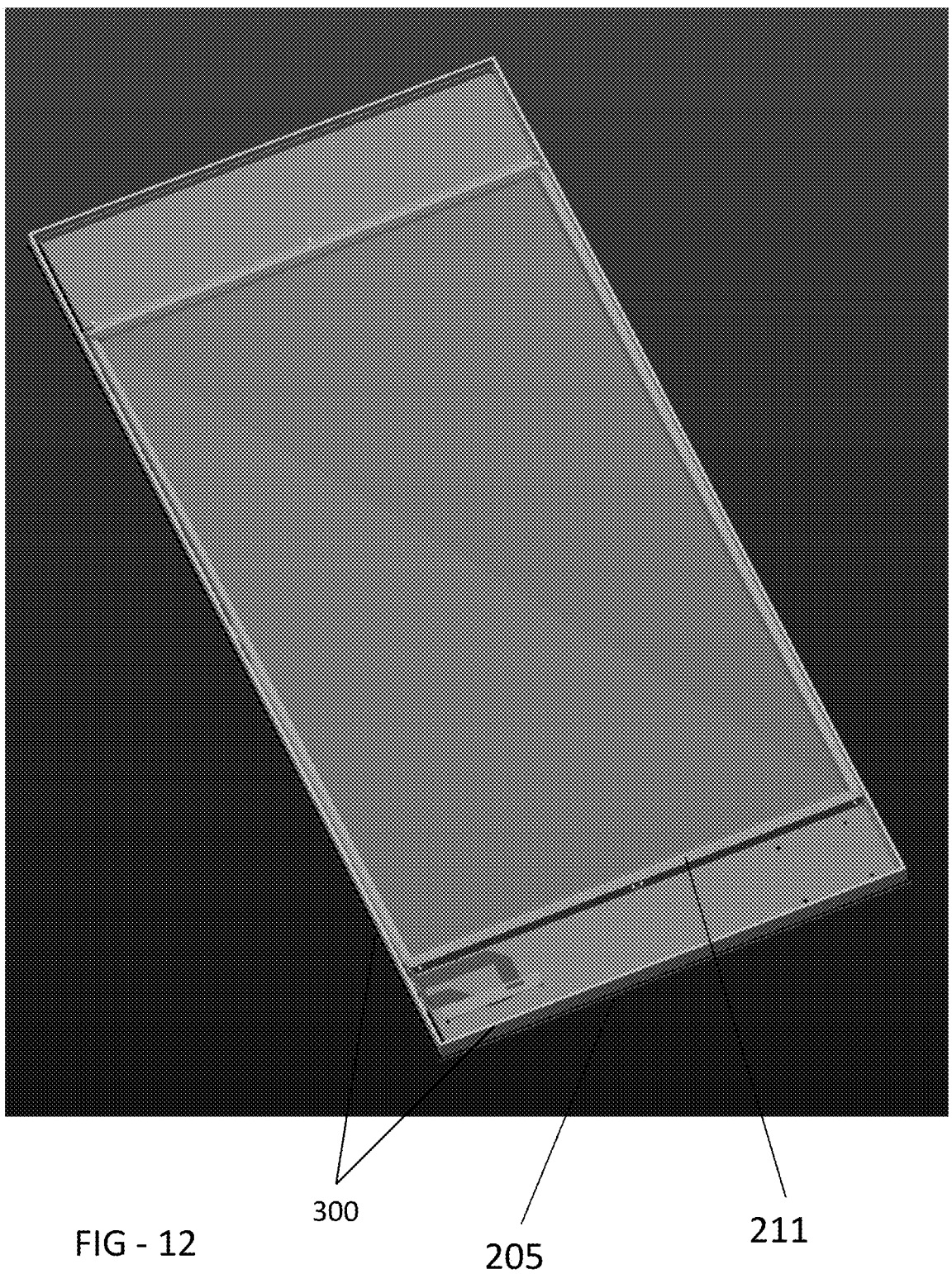
FIG. 12 is a perspective view of a partially assembled exemplary embodiment of a sealed transparent LCD assembly.

FIG. 12 is a perspective view of a partially assembled exemplary embodiment of a sealed transparent LCD assembly. This view shows the rear glass 205 with the spacer 300 attached around the perimeter of the glass 205. Also shown is the rear bracket 211 which is attached to the rear glass 205 as well.

The embodiments of the sealed transparent LCD assembly described herein can be used with any number of display case designs, either temperature controlled or not, and with doors that open or glass that remains stationary.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A transparent LCD assembly comprising:
a transparent LCD placed between a front glass and a rear glass, said transparent LCD having an upper edge;
a light guide positioned behind the transparent LCD and having an upper edge and at least one side edge;
a plurality of LEDs position along the upper edge of the light guide; and
a top cavity positioned above the upper edge of the light guide and the upper edge of the transparent LCD, wherein said top cavity is positioned between the front glass and rear glass such that light which exits the LEDs is permitted to enter both (1) the light guide as well as (2) the top cavity.

2. The transparent LCD assembly of claim 1 wherein:
the top cavity is configured to permit light entering the top cavity to exit through the front glass.

3. The transparent LCD assembly of claim 1 further comprising:
a mask placed on the front glass and adjacent to the LEDs.

4. The transparent LCD assembly of claim 1 further comprising:
a reflective surface positioned within the top cavity.

5. The transparent LCD assembly of claim 1 further comprising:
a top thermal plate bonded to the rear glass and in thermal communication with the LEDs.

6. The transparent LCD assembly of claim 5 wherein:
the LEDs are attached to a PCB which is attached to the top thermal plate.

7. The transparent LCD assembly of claim 6 further comprising:
a graphic placed adjacent to the top cavity.

8. The transparent LCD assembly of claim 1 further comprising:
a first and second bracket positioned to secure the light guide in the Z direction (into/out of the assembly when observing the LCD) while permitting thermal expansion/contraction of the light guide in the X-Y direction (horizontal and vertical when observing the LCD).

9. A transparent LCD assembly comprising:
a transparent LCD placed between a front glass and a rear glass, wherein said front glass has an outer edge which extends beyond a corresponding outer edge of the transparent LCD;
a light guide positioned behind the transparent LCD and having an edge corresponding to the outer edges of the front glass and the transparent LCD;
a plurality of LEDs positioned along the edge of the light guide; and
a cavity, defined at least in part by the portion of the front glass extending beyond the outer edge of the transparent LCD, wherein the cavity is positioned on the opposite side of the LEDs as compared to the light guide such that light which exits the LEDs is permitted to enter both (1) the light guide as well as (2) the cavity;
wherein the cavity is configured to receive a graphic.

10. The transparent LCD assembly of claim 9 further comprising:
a mask placed on the front glass and adjacent to the LEDs.

11. The transparent LCD assembly of claim 10 further comprising:
a reflective surface positioned within the cavity.

12. The transparent LCD assembly of claim 10 further comprising:
a thermal plate bonded to the rear glass and in conductive thermal communication with the LEDs.

13. The transparent LCD assembly of claim 12 wherein:
the LEDs are attached to a PCB which is attached to the thermal plate.

14. A transparent LCD assembly comprising:
a transparent LCD configured to display an image, wherein said transparent LCD is placed between a front glass and a rear glass, wherein said front glass has an outer side edge which extends beyond a corresponding outer side edge of the transparent LCD;
a light guide positioned behind the transparent LCD and having an edge;
a plurality of LEDs positioned along the edge of the light guide;
a cavity positioned entirely on the opposite side of the LEDs as compared to the light guide;
a first bracket placed between the LEDs and the cavity; and
a plurality of apertures within the first bracket;
wherein the cavity is defined, at least in part, by the portion of the front glass extending beyond the outer side edge of the transparent LCD;
wherein the cavity is configured to receive a static graphic and is positioned such that the images displayed on the transparent LCD and any static graphic received within the cavity may be simultaneously viewed in a visually unobstructed fashion.

15. The transparent LCD of claim 14 wherein:
the apertures are configured to permit light emitted from the LEDs to pass through the first bracket.

16. The transparent LCD of claim 15 further comprising:
a second bracket where the light guide is sandwiched between the first and second brackets.

17. The transparent LCD of claim 14 wherein:
the apertures are configured to permit light emitted from the LEDs to enter the cavity.

18. The transparent LCD of claim 14 wherein:
the cavity is configured to permit light emitted from the LEDs to enter both the light guide as well as the cavity.

* * * * *

UNITED STATES PATENT AND TRADEMARK OFFICE
CERTIFICATE OF CORRECTION

Page 1 of 1

PATENT NO. : 10,649,273 B2
APPLICATION NO. : 14/878679
DATED : May 12, 2020
INVENTOR(S) : Marcos Diaz et al.

It is certified that error appears in the above-identified patent and that said Letters Patent is hereby corrected as shown below:

On the Title Page

Page 2, Column 2, References Cited, U.S. Patent Documents, Line 23 reference no. 2001/0033726, please insert -- et al. --.
Page 3, Column 1, References Cited, U.S. Patent Documents, Line 11 reference no. 2009/0015400, please delete "Reed" and insert -- Breed --.
Page 3, Column 2, References Cited, Foreign Patent Documents, Line 11 please delete "CN CA202815379" and insert -- CN 202815379 --.

Signed and Sealed this
Thirtieth Day of June, 2020

Andrei Iancu
*Director of the United States Patent and Trademark Office*